USO08918889B2

(12) United States Patent
Shima

(10) Patent No.: US 8,918,889 B2
(45) Date of Patent: Dec. 23, 2014

(54) INFORMATION PROCESSING APPARATUS AND METHOD

(75) Inventor: Hisato Shima, Tokyo (JP)

(73) Assignee: Sony Corporation, Tokyo (JP)

( * ) Notice: Subject to any disclaimer, the term of this patent is extended or adjusted under 35 U.S.C. 154(b) by 1962 days.

(21) Appl. No.: 11/139,557

(22) Filed: May 31, 2005

(65) Prior Publication Data

US 2005/0287991 A1     Dec. 29, 2005

(30) Foreign Application Priority Data

Jun. 11, 2004   (JP) ................................. 2004-174630

(51) Int. Cl.
| | | |
|---|---|---|
| G06F 7/04 | (2006.01) | |
| G06F 21/10 | (2013.01) | |
| H04L 29/06 | (2006.01) | |

(52) U.S. Cl.
CPC ............... H04L 63/12 (2013.01); G06F 21/10 (2013.01); H04L 63/0492 (2013.01); H04L 2463/101 (2013.01)
USPC ............ 726/26; 726/2; 726/3; 726/4; 726/11; 726/12; 726/13; 726/14; 726/22

(58) Field of Classification Search
USPC .............................................. 726/26; 705/51
See application file for complete search history.

(56) References Cited

U.S. PATENT DOCUMENTS

| | | | | |
|---|---|---|---|---|
| 5,974,550 | A * | 10/1999 | Maliszewski | 726/2 |
| 6,708,281 | B1 * | 3/2004 | Walsh | 713/400 |
| 6,802,000 | B1 * | 10/2004 | Greene et al. | 713/168 |
| 2002/0166048 | A1 * | 11/2002 | Coulier | 713/169 |
| 2002/0186833 | A1 * | 12/2002 | Lucas | 379/361 |
| 2004/0107252 | A1 * | 6/2004 | Futa et al. | 709/204 |
| 2004/0268131 | A1 | 12/2004 | Kudo et al. | |
| 2005/0147108 | A1 | 7/2005 | Nakano | |
| 2005/0287991 | A1 | 12/2005 | Shima | |
| 2006/0094362 | A1 * | 5/2006 | Pan | 455/63.1 |

(Continued)

FOREIGN PATENT DOCUMENTS

| | | |
|---|---|---|
| CN | 1469601 a | 1/2004 |
| JP | 64-76261 | 3/1989 |

(Continued)

OTHER PUBLICATIONS

3GPP (ETSI TS 133 102 v3.11.0, Universal Mobile Telecommunications System (UMTS), Mar. 2002).*
"DTCP vol. 1 Supplement E Revision 1.0 (Informational Version)", Nov. 24, 2003, pp. 1-19.

(Continued)

Primary Examiner — Peter Poltorak
(74) Attorney, Agent, or Firm — Oblon, Spivak, McClelland, Maier & Neustadt, L.L.P.

(57) ABSTRACT

An information processing apparatus for determining whether or not to transmit a predetermined content to a reception apparatus connected to a network, in accordance with a response time taken to respond to a predetermined command, including: reception means receiving a response to a command; measuring means measuring the response time to the command; authentication means authenticating the reception apparatus; generation means generating authentication data to be inserted into the command; transmission means transmitting the command including predetermined one of the authentication data; storage means storing the authentication data contained in the command and the response data contained in the response; request means requesting the reception apparatus for transmission of the authentication data and the response data; and determination means determining whether the authentication data and the response data transmitted from the reception apparatus, and determining transmission permission/inhibition of a content to the reception apparatus.

14 Claims, 9 Drawing Sheets

(56) References Cited

U.S. PATENT DOCUMENTS

| | | |
|---|---|---|
| 2006/0153096 A1 | 7/2006 | Nakano |
| 2006/0154620 A1 | 7/2006 | Shima |
| 2006/0209689 A1 | 9/2006 | Nakano et al. |
| 2006/0294362 A1* | 12/2006 | Epstein .................. 713/153 |

FOREIGN PATENT DOCUMENTS

| | | |
|---|---|---|
| JP | 5-7218 | 1/1993 |
| JP | 11-195004 | 7/1999 |
| JP | 11-203249 | 7/1999 |
| JP | 2001-285284 | 10/2001 |
| WO | WO 2004/014037 A1 | 2/2004 |
| WO | WO 2004/030311 A1 | 4/2004 |

OTHER PUBLICATIONS

Ian Fried. 'Apple limits iTunes file sharing'. [online]. CNET News.com. May 27, 2003. Retrieved from internet: <URL: http:news.com.com/2100-1027_3-1010541.html?tag=cd_mh>.

Hitachi Ltd. et al. 'Digital Transmission Content Protection Specification vol. 1 Revision 1. 2a (informational Version)' [online]. digital Transmission Licensing Administrator. Feb. 25, 2002. Retrieved from inte4rnet: <URL: http://web.archive.org/web/20030604012332/www.ctcp.com/data/info_vl.pdf>.

Hachiro Endo, Batsuryu Man no Tameno Pasokon Katsuyo Jissen Koza-96-Network Settei no Kakunin Ho Ho; Material Flow, Kabushiki Kaisha Ryutsu Kenkyusha, vol. 43, No. 5, p. 125, Jun. 1, 2002.

Office Action issued Sep. 19, 2014, in Chinese Patent Application No. 201210213820X (with English translation).

* cited by examiner

INFORMATION PROCESSING APPARATUS AND METHOD

CROSS REFERENCE TO RELATED APPLICATIONS

The present invention contains subject matter related to Japanese Patent Application JP2004-174630, filed in the Japanese Patent Office on Jun. 11, 2004, the entire contents of which being incorporated herein by reference.

BACKGROUND OF THE INVENTION

1. Field of the Invention

The present invention relates to an information processing apparatus and method, and more particularly to an information processing apparatus and method capable of properly receiving and transmitting, e.g., a copyright content.

2. Description of Related Art

With the recent spread of public wide area networks (hereinafter called WAN) typically the Internet and local area networks (hereinafter called LAN) installed in general houses, various data communications are vigorously performed via these networks.

When a content such as video and music is transferred via a network, authentication and key exchange are performed between a communication partner apparatus and an encrypted content is transmitted in order to protect copyright (refer to a non-patent document DTCP Specification Volume 1 Version 1.3 (Information Version).

From the viewpoint of the copyright, there is a case in which although copy and transmission in a home are permitted, content transmission to and from another home interconnected by WAN is desired to be limited. For example, this limitation becomes necessary in a case in which although a content obtained by recording television broadcasting can be used in a private use range (in a home), transmission of this content to the third party is considered infringement of the copyright.

Under this limitation, an apparatus (transmission apparatus) for transmitting a content protected by the copyright is required to determine whether a communication partner apparatus (reception apparatus) for receiving the content is in the same LAN or is connected via a WAN.

For example, it is possible to check from an IP address whether a communication partner is in the same subnet, or to know from the number of routers (Hop Count) through which an IP communication packet has passed whether a communication partner is connected via a WAN (the Internet). In communications via a WAN (the Internet), however, the same subnet connection without IP routers becomes possible if technologies such as a virtual private network (VPN) are used. Namely, it is possible to obtain contents illegally.

A method has been proposed which determines a communication distance by measuring a round trip time (RTT) of communications with a communication partner. This utilizes that a WAN such as the Internet has a longer communication data transmission time than that of a home LAN, because of a longer communication distance and a time required for processes at intermediate routers and the like.

For example, as shown in FIG. 1A, a transmission apparatus measures a round trip time such as a transmission time of a measurement command (S1) taken to reach a reception apparatus and a transmission time of a response (S2) to the measurement command from the reception apparatus. A round trip time in the same home network is a predetermined specified time (e.g., 5 mS) or shorter, whereas communications via the Internet (WAN) take a longer time (e.g., 7 mS). It is therefore possible to determine from the round trip time whether the reception apparatus is connected via a WAN.

SUMMARY OF THE INVENTION

However, if a content transmission permission/inhibition is determined only by a round trip time, as shown in FIG. 1B, a round trip time can be shortened and contents can be obtained illegally, by inserting a third apparatus x in an intermediate path (e.g., in the same LAN) and responding to the measurement command.

The reception apparatus may be made to respond by using information only the reception apparatus can know. However, as shown in FIG. 1C, the apparatus x sends beforehand a measurement command S21 to the reception apparatus and acquires a response S22 based on the information only the reception apparatus can know. When a measurement command S31 is sent from the transmission apparatus, a memorized response S32 is returned so that the reception apparatus can be spoofed as an authorized apparatus through identity theft.

The present invention has been made under these circumstances, and allows proper transfer of, for example, contents protected by the copyright.

A first information processing apparatus of the present invention includes: reception means for receiving a response to a command sent from a reception apparatus, the response including predetermined response data; measuring means for measuring a response time to the command sent from the reception apparatus; authentication means for authenticating the reception apparatus in accordance with the response time measured with the measurement means; generation means for generating authentication data to be inserted into the command; transmission means for transmitting the command including predetermined one of the authentication data generated by the authentication means to the reception apparatus k times at a maximum until the authentication means succeeds authentication; storage means for storing the authentication data contained in the command transmitted by the transmission means and the response data contained in the response received by the reception means; request means for requesting the reception apparatus authenticated by the authentication means for transmission of the authentication data contained in the command received an n-the time and the response data contained in the response to the command; and determination means for determining whether the authentication data and the response data transmitted from the reception apparatus in response to a request from the request means are coincident with the authentication data contained in the command transmitted the n-th time and the response data contained in the response to the command, and for determining from a determination result transmission permission/inhibition of a content to the reception apparatus.

The determination means may authenticate the reception apparatus in accordance with a signature created from the authentication data, the response data and data shared among apparatuses capable of using a content, respectively transmitted from the reception apparatus in response to a request from the request means.

The measurement means may measure, as the response time, a time from when the command is transmitted from the transmission means to when the response to the command is received at the reception apparatus.

A first information processing method of the present invention includes: a reception step of receiving a response to a command sent from a reception apparatus, the response including predetermined response data; a measuring step of measuring a response time to the command sent from the reception apparatus; an authentication step of authenticating the reception apparatus in accordance with the response time measured by a process in the measurement step; a generation step of generating authentication data to be inserted into the command; a transmission step of transmitting the command including predetermined one of the authentication data generated by a process in the authentication step to the reception apparatus k times at a maximum until authentication succeeds by a process in the authentication step; a storage step of storing the authentication data contained in the command transmitted by a process in the transmission step and the response data contained in the response received by a process in the reception step; a request step of requesting the reception apparatus authenticated by a process of the authentication step for transmission of the authentication data contained in the command received n-th time and the response data contained in the response to the command; and a determination step of determining whether the authentication data and the response data transmitted from the reception apparatus in response to a request by a process in the request step are coincident with the authentication data contained in the command transmitted n-th time and the response data contained in the response to the command, and for determining from a determination result transmission permission/inhibition of a content to the reception apparatus.

In the first information processing apparatus and method of the present invention: a response including predetermined response data to a command sent from a reception apparatus is received; a response time to the command sent from the reception apparatus is measured; the reception apparatus is authenticated in accordance with the measured response time; authentication data to be inserted into the command is generated; the command including predetermined one of the generated authentication data is transmitted to the reception apparatus k times at a maximum until authentication succeeds; the authentication data contained in the transmitted and the response data contained in the received response; the authenticated reception apparatus is requested for transmission of the authentication data contained in the command received n-th time and the response data contained in the response to the command; and it is determined whether the authentication data and the response data transmitted from the reception apparatus in response to the request are coincident with the authentication data contained in the command transmitted n-th time and the response data contained in the response to the command, and permission/inhibition of a content to the reception apparatus is determined in accordance with the determination result.

A second information processing apparatus of the present invention includes: reception means for receiving a command including predetermined authentication data transmitted from a transmission apparatus; first transmission means for transmitting a response including predetermined response data to the command, to the transmission apparatus; and second transmission means for transmitting the authentication data contained in the command received n-th time and the response data contained in the response to the command, to the transmission apparatus, in response to a request from the transmission apparatus.

The second transmission means may transmit the authentication data, the response data and a signature created from data shared among apparatuses capable of using a content, to the transmission apparatus.

A second information processing method of the present invention includes: a reception step of receiving a command including predetermined authentication data transmitted from a transmission apparatus; a first transmission step of transmitting a response including predetermined response data to the command, to the transmission apparatus; and a second transmission step of transmitting the authentication data contained in the command received n-th time and the response data contained in the response to the command, to the transmission apparatus, in response to a request from the transmission apparatus.

In the second information processing apparatus and method of the present invention: a command including predetermined authentication data transmitted from a transmission apparatus is received; a response including predetermined response data to the command is transmitted to the transmission apparatus; and in response to a request from the transmission apparatus, the authentication data contained in the command received n-th time and the response data contained in the response to the command are transmitted to the transmission apparatus.

According to the present invention, for example, a content protected by a copyright can be transferred properly.

DESCRIPTION OF THE PREFERRED EMBODIMENTS

Figure 1:
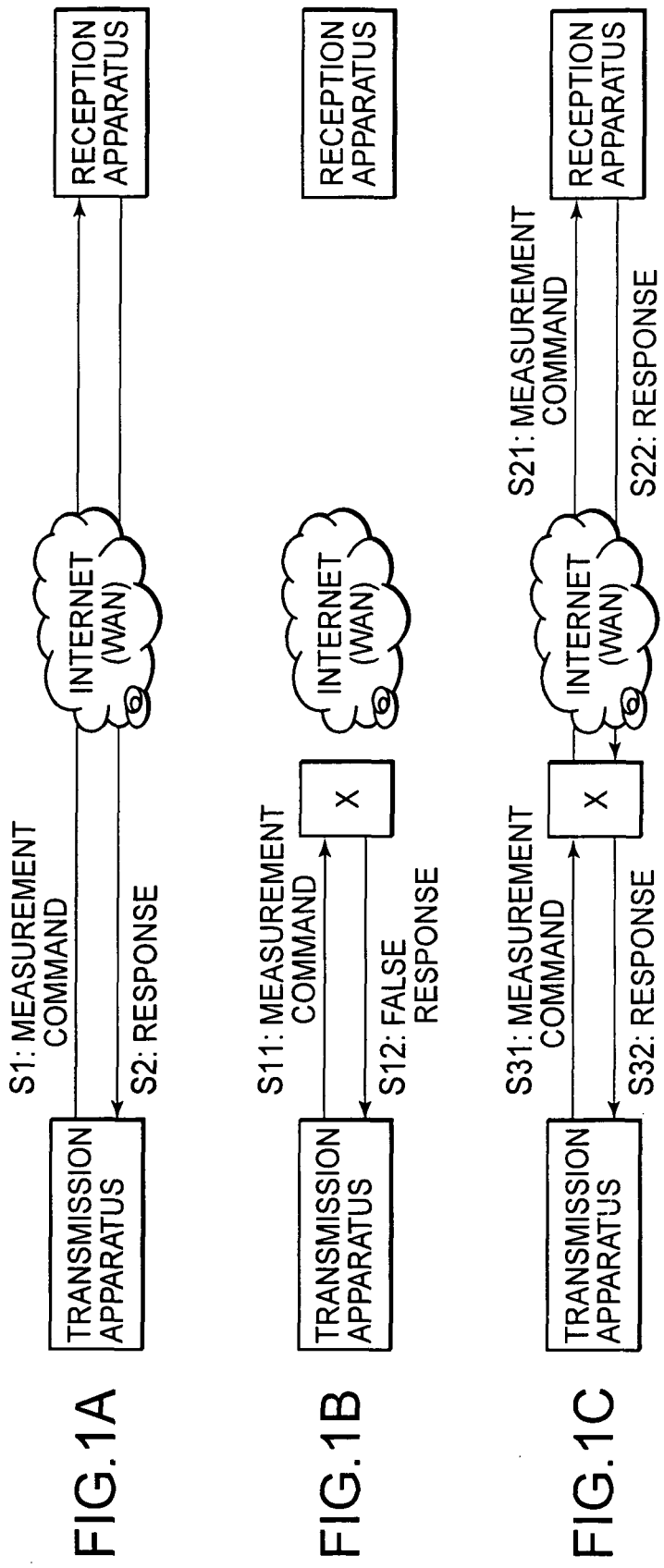
FIGS. 1A, 1B and 1C are diagrams illustrating examples of using a communication system in a related art.

A first information processing apparatus of the present invention includes: reception means (e.g., a measurement response reception unit 33 shown in FIG. 4) for receiving a response to a command sent from a reception apparatus, the response including predetermined response data; measuring means (e.g., an RTT measurement unit 35 shown in FIG. 4) for measuring a response time to the command sent from the reception apparatus; authentication means (e.g., a control determination unit 38 shown in FIG. 4) for authenticating the reception apparatus in accordance with the response time measured with the measurement means; generation means (e.g., authentication data generation unit 31 shown in FIG. 4) for generating authentication data to be inserted into the command; transmission means (e.g., a measurement command transmission unit 32 shown in FIG. 4) for transmitting the command including predetermined one of the authentication data generated by the authentication means to the reception apparatus k times at a maximum until the authentication means succeeds authentication; storage means (e.g., a memory unit 34 shown in FIG. 4) for storing the authentication data contained in the command transmitted by the transmission means and the response data contained in the response received by the reception means; request means (e.g., a control command transmission unit 36 shown in FIG. 4) for requesting the reception apparatus authenticated by the authentication means for transmission of the authentication data contained in the command received n-th time and the response data contained in the response to the command; and determination means (e.g., a control determination unit 38 shown in FIG. 4) for determining whether the authentication data and the response data transmitted from the reception apparatus in response to a request from the request means are coincident with the authentication data contained in the command transmitted n-th time and the response data contained in the response to the command, and for determining from a determination result transmission permission/inhibition of a content to the reception apparatus.

A first information processing method of the present invention includes: a reception step (e.g., Step S56 shown in FIG. 6) of receiving a response to a command sent from a reception apparatus, the response including predetermined response data; a measuring step (e.g., Steps S55 and S59 shown in FIG. 6) of measuring a response time to the command sent from the reception apparatus; an authentication step (e.g., Step S61 shown in FIG. 6) of authenticating the reception apparatus in accordance with the response time measured by a process in the measurement step; a generation step (e.g., Step S53 shown in FIG. 6) of generating authentication data to be inserted into the command; a transmission step (e.g., Steps S54 to S63 shown in FIG. 6) of transmitting the command including predetermined one of the authentication data generated by a process in the authentication step to the reception apparatus k times at a maximum until authentication succeeds by a process in the authentication step; a storage step (e.g., Steps S55 and S60) of storing the authentication data contained in the command transmitted by a process in the transmission step and the response data contained in the response received by a process in the reception step; a request step (e.g., Step S64 shown in FIG. 6) of requesting the reception apparatus authenticated by a process of the authentication step for transmission of the authentication data contained in the command received n-th time and the response data contained in the response to the command; and a determination step (e.g., Step S66 shown in FIG. 6) of determining whether the authentication data and the response data transmitted from the reception apparatus in response to a request by a process in the request step are coincident with the authentication data contained in the command transmitted n-th time and the response data contained in the response to the command, and for determining from a determination result transmission permission/inhibition of a content to the reception apparatus A second information processing apparatus of the present invention includes: reception means (e.g., a measurement command reception unit 53 shown in FIG. 5) for receiving a command including predetermined authentication data transmitted from a transmission apparatus; first transmission means (e.g., a measurement response transmission unit 55 shown in FIG. 5) for transmitting a response including predetermined response data to the command, to the transmission apparatus; and second transmission means (e.g., a control response transmission unit 58 shown in FIG. 5) responsive to a request from the transmission apparatus for transmitting the authentication data contained in the command received n-th time and the response data contained in the response to the command, to the transmission apparatus.

A second information processing method of the present invention includes: a reception step (e.g., Step S86 shown in FIG. 7) of for receiving a command including predetermined authentication data transmitted from a transmission apparatus; a first transmission step (e.g., Step S92 shown in FIG. 7) of transmitting a response including predetermined response data to the command, to the transmission apparatus; and a second transmission step (e.g., Step S94 shown in FIG. 7) responsive to a request from the transmission apparatus of transmitting the authentication data contained in the command received n-th time and the response data contained in the response to the command, to the transmission apparatus.

Figure 2:
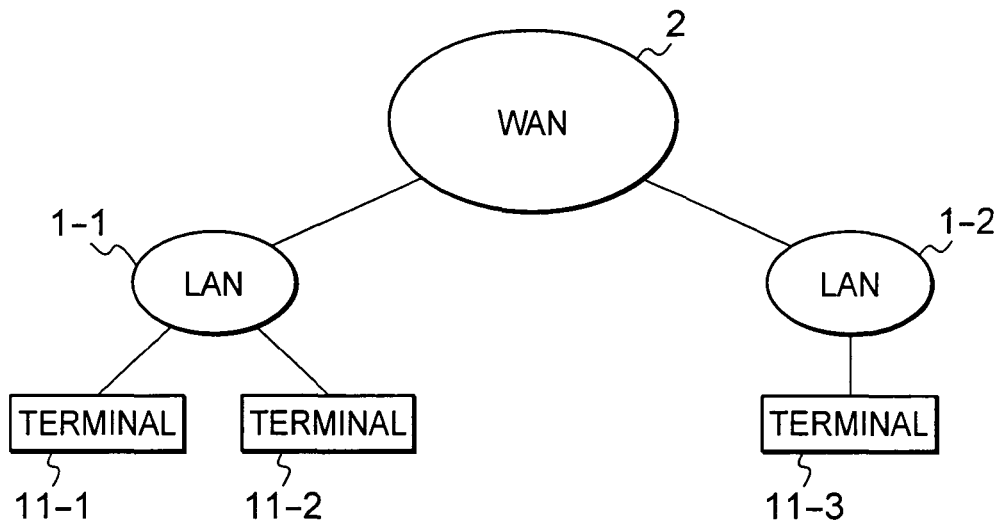
FIG. 2 is a diagram showing an example of using a communication system adopting the present invention.

FIG. 2 shows an example of the structure of a communication system including terminals 11 and adopting the present invention.

LANs 1-1 and 1-2 (hereinafter called simply LAN 1 if they are not necessary to identify individually, this being applied also to the following description) are interconnected via a WAN 2 typically the Internet.

LAN 1-1 is installed, for example, in a house, and has a scale of about the degree to be used by individuals (or families). Terminals 11-1 and 11-2 such as personal computers and AV apparatuses are connected to LAN 1-1 via a switching hub (not shown). Interconnection between LAN 1-1 and the terminals 11-1 and 11-2 is established, for example, by a high speed interface such as Ethernet (registered trademark) (100BASE-TX). Terminals 11-1 and 11-2 can be connected to LAN 1-2 via LAN 1-1 and WAN 2.

LAN 1-2 is configured in a similar manner to that for LAN 1-1, and has a terminal 11-3 connected thereto.

Each terminal 11 is registered as an apparatus capable of transferring a predetermined content protected by a copyright (the apparatus of this type is called hereinafter an authorized apparatus where appropriate). Each terminal 11 can transfer this content to and from another terminal in the same LAN 1.

Figure 3:
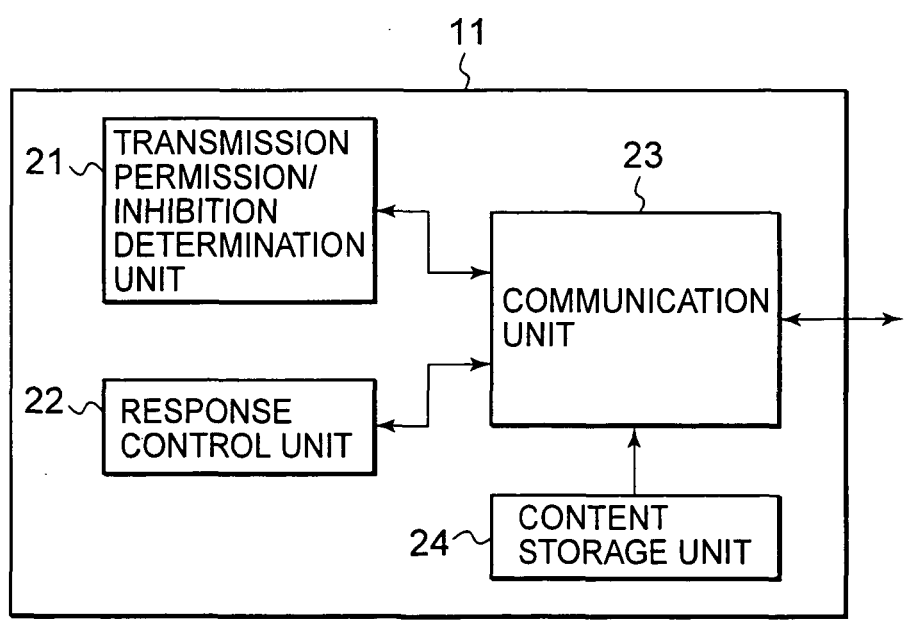
FIG. 3 is a block diagram showing an example of the structure of a terminal shown in FIG. 2.

As shown in FIG. 3, the terminal 11 is configured to have a transmission permission/inhibition determination unit 21, a response control unit 22, a communication unit 23 and a content storage unit 24.

When a content (e.g., a content stored in the content storage unit 24) protected by a copyright is to be transmitted, the transmission permission/inhibition determination unit 21 determines, from a round trip time (RTP) with a reception side apparatus, whether the reception side apparatus is in the same LAN 1, and receives from the reception side apparatus the information only an authorized apparatus can know, to thereby confirm whether the RTT measurement partner is identical to the provider of the information only the authenticated apparatus can know. In accordance with this confirmation result, the transmission permission/inhibition determination unit 21 determines content transmission permission/inhibition.

In the example shown in FIG. 1C, it is not confirmed whether the RTT measurement partner (apparatus x) is identical to the provider (reception apparatus) of the information only the authenticated apparatus can know. Therefore, the unauthorized apparatus x inserted in the same LAN as that of the transmission apparatus makes the reception apparatus supply the information only the authorized apparatus can know to the transmission apparatus so that a content can be illegally obtained from the transmission apparatus. However, according to the present invention, it is confirmed as will be later described whether the RTT measurement partner (apparatus x) is identical to the provider (reception apparatus) of the information only the authenticated apparatus can know, so that piracy such as explained in FIG. 1C can be avoided.

When a predetermined content is to be received from the reception side terminal 11, the response control unit 22 communicates with the transmission side apparatus via the communication unit 23 in a manner to be described later, and transmits to the transmission side apparatus information necessary for receiving the content (the information including data necessary for RTT measurement, information only the authorized apparatus can know, information necessary for confirming whether the RTT measurement partner is identical to the provider of the information only the authenticated apparatus can know).

The communication unit 23 is connected to LAN 1 and communicates with an apparatus in the same LAN 1 or with an apparatus connected to a different LAN 1 via WAN 2.

The content storage unit 24 stores therein contents to be transmitted to a reception side terminal 11. This content is protected, for example, by a copyright, and can be supplied only to the terminal 11 permitted to use the content by the copyright and connected to the same LAN 1 as that of the transmission side terminal 11.

Figure 4:
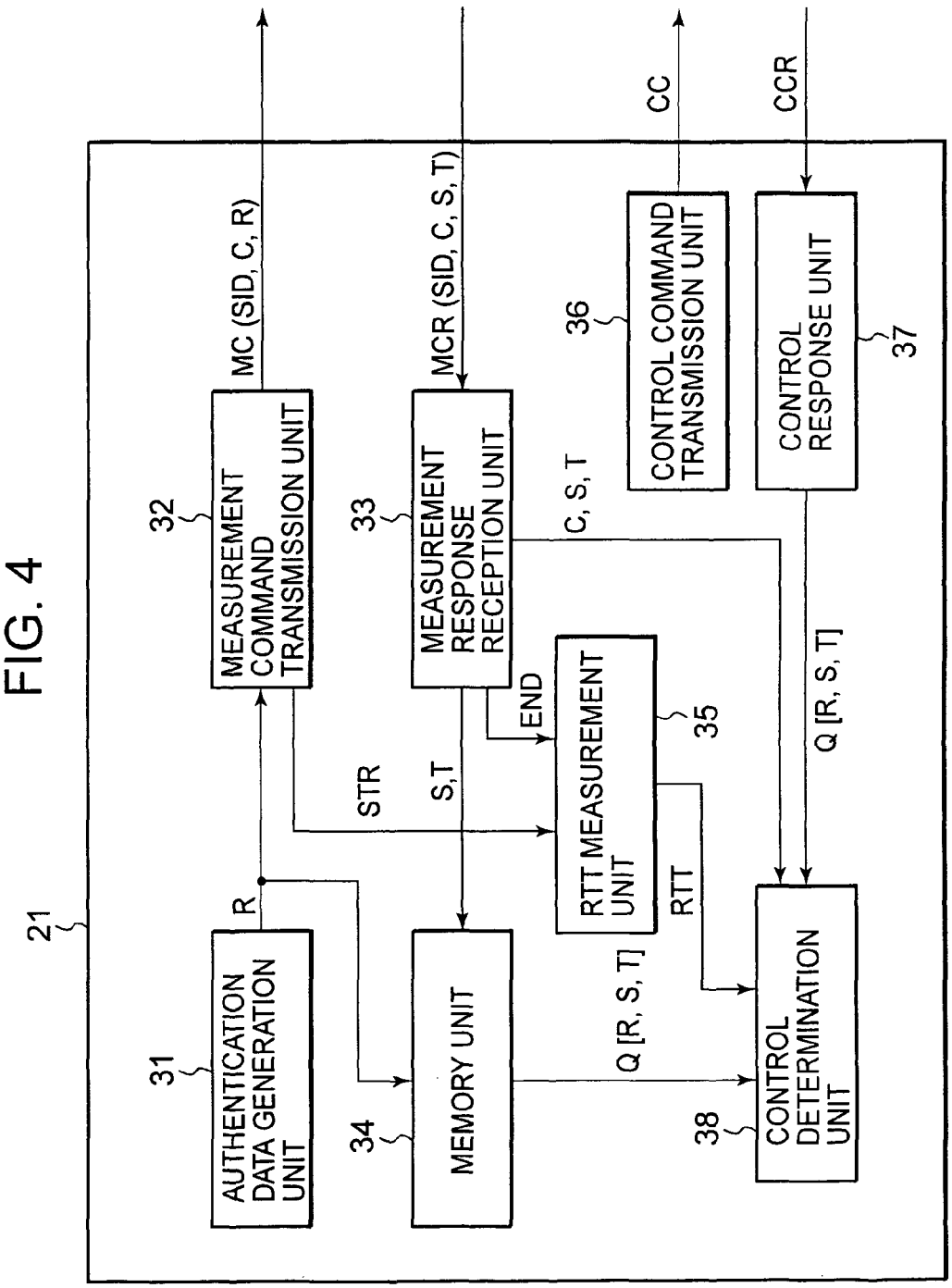
FIG. 4 is a block diagram showing an example of the structure of a transmission permission/inhibition unit shown in FIG. 3.

FIG. 4 shows an example of the structure of the transmission permission/inhibition determination unit 21 of the terminal 11.

An authentication data generation unit 31 generates authentication data R constituting a measurement command MC to be transmitted to a reception side apparatus for RTT measurement. Since this authentication data R is used as a random challenge, it is constituted of a numerical sequence such as a pseudo-random number sequence which is unpredictable and is generated each time the authentication data is generated.

A measurement command transmission unit 32 transmits the measurement command MC to a reception side apparatus through UDP communications, the measurement command including the authentication data R generated by the authentication data generation unit 31.

A measurement response reception unit 33 receives a response MCR from the reception side apparatus, in response to the measurement command MC transmitted from the measurement command transmission unit 32.

A memory unit 34 stores the authentication data R inserted in the measurement command MC, response data S contained in the response MCR supplied from the reception side apparatus in response to the measurement command MC, and a response generation time T (to be described later).

An RTT measurement unit 35 measures RTT with the reception side apparatus in response to notices STR and END supplied from the measurement command transmission unit 32 and measurement response reception unit 33.

A control command transmission unit 36 transmits control commands CC to the reception side apparatus through TCP communications, the control command including a start command and a confirmation command (to be later described). A control response reception unit 37 receives a response CCR from the reception side apparatus, in response to the control command CC.

A control determination unit 38 controls the above-described units to determine from RTT with the reception side apparatus whether reception side apparatus is in the same LAN 1, and receives from the reception side apparatus the information only the authorized apparatus can know, to thereby confirm whether the RTT measurement partner is identical to the provider of the information only the authorized apparatus can know. In accordance with this confirmation result, the control determination unit 38 determines content transmission permission/inhibition.

Arrows interconnecting the units in FIG. 4 indicate a flow of transmission/reception of main data.

Figure 5:
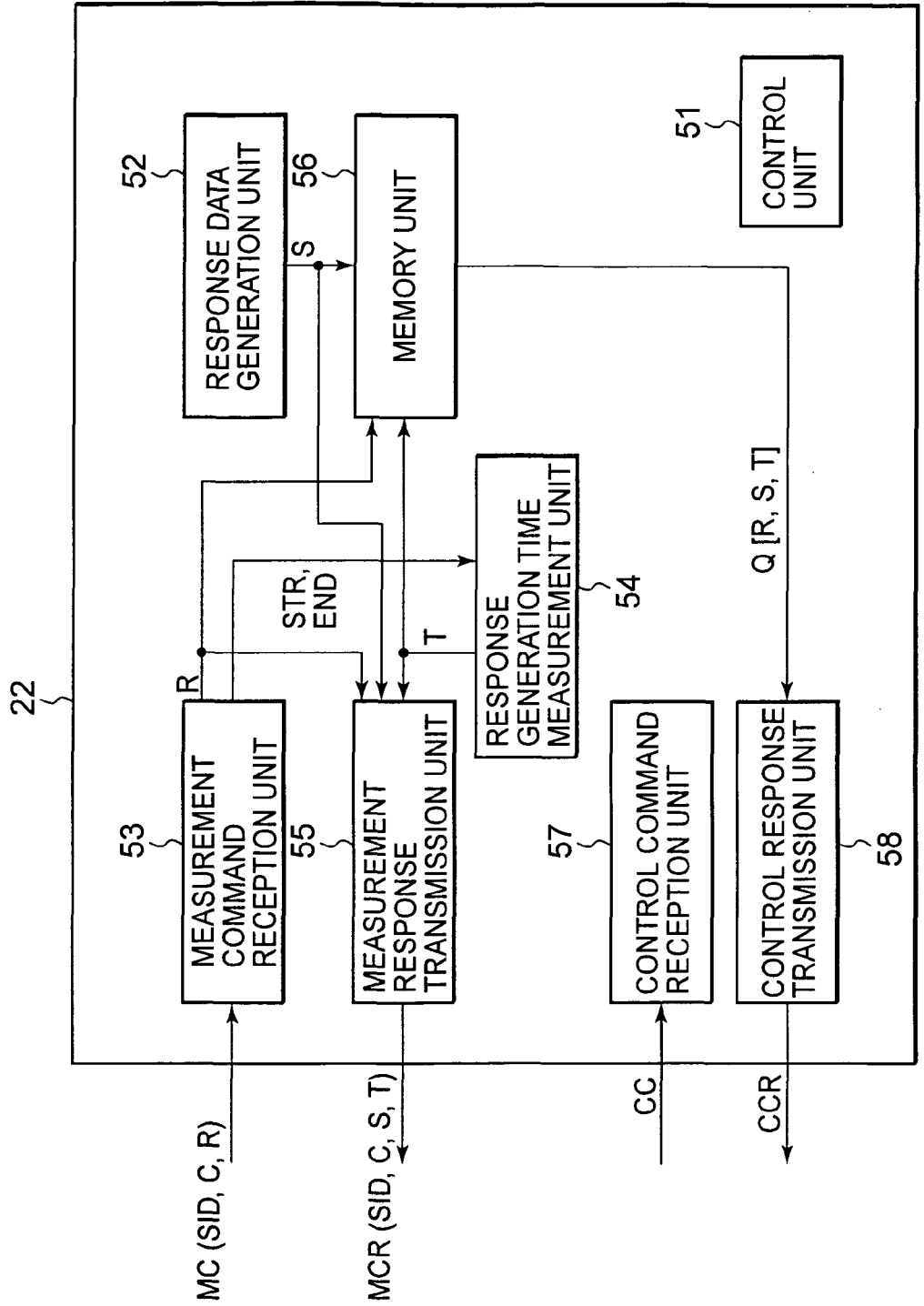
FIG. 5 is a block diagram showing an example of the structure of a response control unit shown in FIG. 3.

FIG. 5 shows an example of the structure of the response control unit 22 of the terminal 11.

A response data generation unit 52 generates response data S constituting a response MCR to the measurement command MC. Since this response data S is used as a random challenge, it is constituted of a number sequence such as a pseudo-random number sequence which is unpredictable and is generated each time the response data is generated. The response data S is generated independently from the authentication data R to be generated at the transmission side apparatus and they are not common.

A measurement command reception unit 53 receives the measurement command MC from a transmission side apparatus.

A response generation time measurement unit 54 measures a time T (hereinafter called response generation time) taken to generate the response MCR to the measurement command MC, in response to the notices STR and END supplied from the measurement command reception unit 53.

A measurement response transmission unit 55 generates the response MCR to the measurement command MC and transmits it to the transmission side apparatus through UDP communications, the response MCR including data necessary for RTT measurement (such as response data S and response generation time T (to be described later)).

A memory unit 56 stores the authentication data R contained in the measurement command MC, and the response data S and response generation time T transmitted and contained in the response MCR.

A control command reception unit 57 receives the control command CC transmitted from the transmission side apparatus. A control response transmission unit 58 transmits the response CCR to the control command CC to the transmission side apparatus through TCP communications. For example, data for confirming whether the RTT measurement partner is identical to the provider of the information only the authorized apparatus can know, is transmitted to the transmission side apparatus as the response CCR to the control command CC.

A control unit 51 controls the above-described units.

Figure 6:
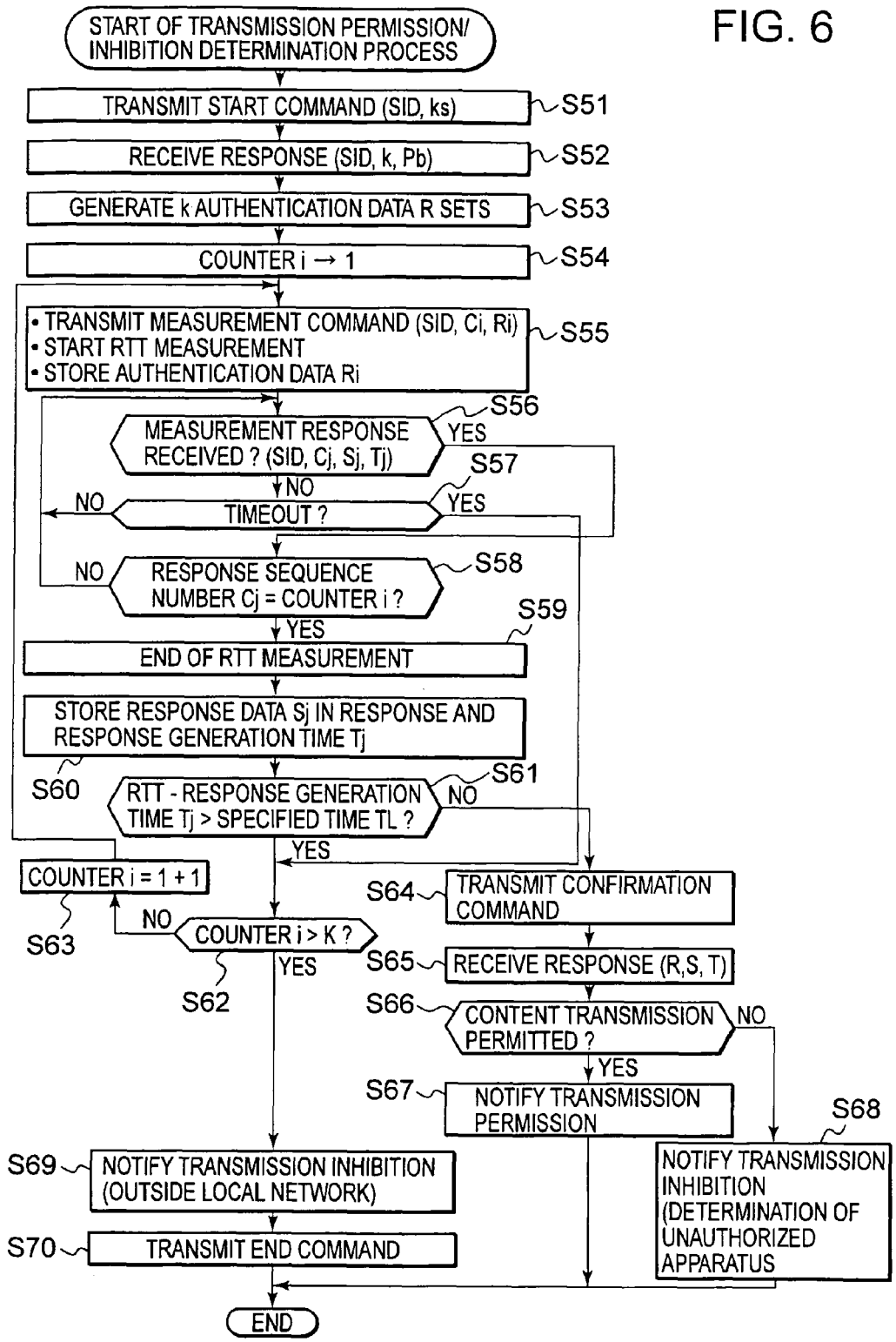
FIG. 6 is a flow chart illustrating a transmission permission/inhibition process.

Next, with reference to the flow chart shown in FIG. 6, description will be made on a transmission permission/inhibition process (a process to be executed by the transmission permission/inhibition determination unit 21 of the terminal 11).

First, the control command transmission unit 36 of the transmission permission/inhibition determination unit 21 of the terminal 11 establishes a TCP connection with a reception side apparatus. It is assumed that a port number for establishing the TCP connection is agreed beforehand between the transmission side terminal 11 and the reception side apparatus. This step may be omitted if a TCP connection is already established between the transmission side apparatus and reception side apparatus.

Next, at Step S51 the control command transmission unit 36 transmits a start command (control command CC) to the reception side apparatus via the established TCP connection, the start command indicating that RTT measurement starts. This start command CC includes a session number SID and the number ks of RTT retry times (measurement times) per session the transmission side terminal 11 can execute.

The session number SID is a number assigned to a series of authentication processes (one session) to be executed at the reception side apparatus. By sharing this session number on the transmission and reception sides, the authentication processes at each session can be distinguished.

Since the data necessary for RTT measurement (e.g., the measurement command MC and its response MCR) is transmitted through UDP communications without packet re-transmission, RTT measurement may not be performed properly, such as data loss in an intermediate communication path, depending upon the communication state. A packet transmission delay may also occur by the influence of other communications in the network. From this reason, the RTT measurement is set so that it can be retried several times. Since the numbers of retries may become different depending upon the settings of the transmission side apparatus and reception side apparatus, in this example the number of retry times ks (e.g., the maximum number of retry times) of the transmission side apparatus is notified to the reception side apparatus.

Next, at Step S52 the control response reception unit 37 receives from the reception side apparatus the response CCR to the start command CC.

The response CCR includes in addition to the session number SID contained in the start command CC, the number k of RTT retry times per session decided by the reception side, and a UDP port number pb for reception of the measurement command MC. In accordance with the start command CC and its response CCR, the transmission side terminal 11 and the reception side apparatus agree on the number k of RTT measurement retry times (the number of measurement times), the session number SID, and the UDP port number pb used by the measurement command MC and its response MCR.

The reception side apparatus decides, as the number k of RTT measurement retry times, a smaller one of the number of RTT measurement retry times capable of being executed at the transmission side terminal 11 notified by the start command CC and the number of RTT measurement retry times capable of being executed on the reception side, and notifies the smaller one to the transmission side apparatus by using the response CCR.

At Step S53 the authentication data generation unit 31 generates authentication data R (k authentication data sets) corresponding to the number k of RTT measurement retry times contained in the response CCR received at Step S52.

At Step S54 the value of a counter i built in the control determination unit 38 is initialized to 1. At this time, the authentication data generation unit 31 supplies the authentication data corresponding to the value of the counter i (e.g., authentication data Ri generated i-th time) to the measurement command transmission unit 32 and memory unit 34.

At Step S55 the measurement command transmission unit 32 transmits the measurement command MC to the reception side apparatus through UDP communications with the UDP port number pb contained in the response CCR to the control command CC, the measurement command including the session number SID, the authentication data Ri (authentication data Ri corresponding to the value of the counter i among the k authentication data sets) supplied from the authentication data generation unit 31 and the sequence number Ci (the number representative of the value of the counter i).

When the measurement command MC is transmitted, the measurement command transmission unit 32 issues a notice STR indicating the transmission to the RTT measurement unit 35. Upon reception of this notice, the RTT measurement unit 35 starts RTT measurement.

The memory unit 34 stores the authentication data Ri supplied from the authentication data generation unit 31 associated with the value of the counter i (associated with the sequence number Ci).

At Step S56 the measurement response reception unit 33 determines whether the response MCR has been received from the reception side apparatus, if it is determined that the response MCR is not still received, the flow advances to Step S57 whereat it is determined whether the response is waited for a predetermined time or longer (it is determined whether a predetermined time has lapsed after the RTT measurement starts at Step S55).

If it is determined at Step S57 that the predetermined time is not still lapsed, the flow returns to Step S56 to thereafter execute the subsequent processes. If it is determined at Step S57 that the predetermined time has lapsed, then the flow advances to Step S62 whereat it is determined whether the value of the counter i is larger than the number k of retry times (it is determined whether the RTT measurement has been performed k times). If it is determined that the value of the counter i is not still larger than the number k of retry times (the RTT measurement is still not performed k times), the flow advances to Step S63 whereat the value of the counter i is incremented by one to thereafter return to Step S55.

In UDP communications for sending the measurement command MC, a packet may not arrive at the communication partner. Therefore, if the transmission side terminal 11 cannot receive the response MCR after the lapse of the predetermined time after the measurement command MC is sent, the current measurement is considered as a failure and the next RTT measurement starts (returning to Step S55).

If it is determined at Step S56 that the response MCR has been received, the flow advances to Step S58 whereat the measurement response reception unit 33 reads from the received response MCR the response data Sj, sequence number Cj and response generation time Tj and supplies them to the control determination unit 38.

The control determination unit 38 determines whether the sequence number Cj supplied from the measurement response reception unit 33 is coincide with the value of the counter i (the sequence number Ci of the transmitted measurement command MC). The meaning of confirming the sequence number Cj of the response MCR and the sequence number Ci of the measurement command MC will be later described.

If it is determined at Step S58 that there is no coincidence, the flow returns to Step S56 whereat the subsequent processes are executed, whereas if it is determined that there is a coincidence, the flow advances to Step S59.

At Step S59 the measurement response reception unit 33 issues a notice END indicating that the response MCR has been received, to the RTT measurement unit 35. The RTT measurement unit 35 terminates the RTT measurement started at Step S55, and supplies a measurement result (RTT) to the control determination unit 38.

At Step S60 the measurement response reception unit 33 supplies the memory unit 34 with the response data Sj and response time generation time Tj contained in the received response MCR. The memory unit 34 stores the response data Sj and response generation time Tj supplied from the measurement response reception unit 33, associated with the value of the counter i. Namely, the memory unit 34 stores the authentication data Ri (Step S55), response data Sj and response generation time Tj associated with the value of the counter i.

Although the details will be later given, the response generation time T is a time taken for the reception side apparatus to generate the response MCR to the measurement command MC.

At Step S61 the control determination unit 38 subtracts the response generation time Tj (contained in the response MCR) supplied from the measurement response reception unit 33 from RTT supplied from the RTT measurement unit 35, and determines whether the value obtained from a subtraction result is longer than the predetermined specified time TL.

The measured RTT is a total sum of a transmission time of the measurement command MC to the reception side apparatus, the response generation time T taken for the reception side to generate the response MCR, and a transmission time of the response MCR to the transmission side terminal 11. The response generation time T taken to generate the response MCR is subtracted from the measured RTT so that an actual RTT can be obtained.

The specified time TL is a time, wherein the actual RTT is shorter than the specified time TL if the transmission side terminal 11 and the reception side apparatus are connected to the same LAN 1. Namely, if the actual RTT is longer than the specified time TL, it can be determined that the reception side apparatus is not connected to the same LAN 1 as that of the transmission side terminal 11. If the actual RTT is not longer (equal to or shorter) than the specified time TL, it can be determined that the reception side apparatus is connected to same LAN 1 as that of the transmission side terminal 11.

If it is determined at Step S61 as YES (if it is determined at the i-th RTT measurement that the reception side apparatus is not connected to the same LAN 1 as that of the transmission side terminal 11), the flow advances to Step S62 whereat the control determination unit 38 determines whether the value of the counter i is larger than k (whether RTT measurement is retried k times). If it is determined that the value of the counter i is not larger than k (that RTT measurement is not retried k times), the flow advances to Step S63 whereat the value of the counter i is incremented by one. At this time, the authentication data generation unit 31 supplies the authentication data Ri corresponding to the new value of the counter i to the measurement command transmission unit 32 and memory unit 34.

Thereafter, the flow returns to Step S55 to execute the subsequent processes. Namely, if the response MCR indicating that the actual RTT is not shorter the specified time TL is not obtained, the RTT measurement is repeated k times at a maximum.

If it is determined at Step S61 as NO (if the response MCR indicating that the actual RTT is equal to or shorter than the specified time TL is obtained), the flow advances to Step S64.

At Step S64 the control command transmission unit 36 transmits a control command (confirmation command) CC to the reception side apparatus, the control command requesting for transmission of the authentication data R contained in the measurement command MC last received at this session, and the response data S and response generation time T contained in the response MCR to the measurement command MC.

At Step S65, upon reception of the response CCR to the confirmation command CC transmitted at Step S64 from the reception side apparatus, the control response reception unit 37 supplies it to the control determination unit 38.

In the response CCR, for example, a hash value (signature) obtained through a hash process based on a secret key shared by authorized apparatuses is given to the authentication data R contained in the measurement command MC last received by the reception side apparatus and to the response data S and response generation time T contained in the response MCR to the measurement command MC.

At Step S66 the control determination unit 38 determines from the response CCR supplied from the control response reception unit 37 whether a content is permitted to be transmitted to the reception side apparatus.

More specifically, the control determination unit 38 reads from the memory unit 34 the authentication data R contained in the measurement command MC last transmitted to the reception side apparatus and the response data S and response generation time T contained in the response MCR to the measurement command MC, and executes the hash process based on the secret key shared by authorized apparatuses.

The control determination unit 38 determines whether the hash value in the response CCR is coincident with the hash value obtained by the hash process by the control determination unit 38. If it is determined that both are coincident, it is determined that the RTT measurement partner is identical to the provider of the information (signature) only an authorized apparatus can know, and that the content is permitted to be transmitted to the reception side apparatus. The authentication data R, response data S and response generation time T for confirming whether the RTT measurement partner is identical to the provider of the information only an authorized apparatus can know, are called confirmation data Q where appropriate.

If the signature given to the response CCR is generated being encrypted by a secret key for protecting the copyright of the whole or a portion of the confirmation data Q, then the control determination unit 38 decrypts the signature by using a public key, and determines whether the resultant confirmation data Q is coincident with the confirmation data Q read from the memory unit 34.

If it is determined at Step S66 that the content is allowed to be transmitted to the reception side apparatus (terminal 11) (if the RTT measurement partner is identical to the provider of the information only an authorized apparatus can know), the flow advances to Step S67 whereat the control determination unit 38 notifies the communication unit 23 (FIG. 3) of that the reception side apparatus is an apparatus to which the content is permitted to be transmitted (an apparatus to which the content is permitted to be transmitted and which is connected to the same LAN 1 as that of the transmission side terminal 11). The communication unit 23 reads the content from the content storage unit 24 and transmits it to the reception side apparatus (terminal 11).

If it is determined at Step S66 that the content is inhibited to be transmitted to the reception side apparatus (if the RTT measurement, partner is not identical to the provider of the information only an authorized apparatus can know), the flow advances to Step S68 whereat the control determination unit 38 notifies the communication unit 23 of that the reception side apparatus is an unauthorized apparatus to which the content is inhibited to be transmitted. The communication unit 23 does not transmit the content to the reception side apparatus.

If it is determined at Step S62 that the value of the counter i is larger than k (if the response MCR indicating that the actual RTT is equal to or shorter than TL cannot be obtained even if the RTT measurement is performed k times), the flow advances to Step S69 whereat the control determination unit 38 notifies the communication unit 23 of that the reception side apparatus is an apparatus outside the local network (an apparatus not connected to the same LAN 1). The communication unit 23 does not transmit the content to the reception side apparatus.

At Step S70 the control command transmission unit 36 transmits an end command (control command) CC to the reception side apparatus.

In the manner described above, the transmission permission/inhibition determination process is executed.

In the above description, although k authentication data sets R are generated at Step S52, each time the measurement command MC is transmitted at Step S55, the authentication data R to be used by the measurement command may be generated each time.

Figure 7:
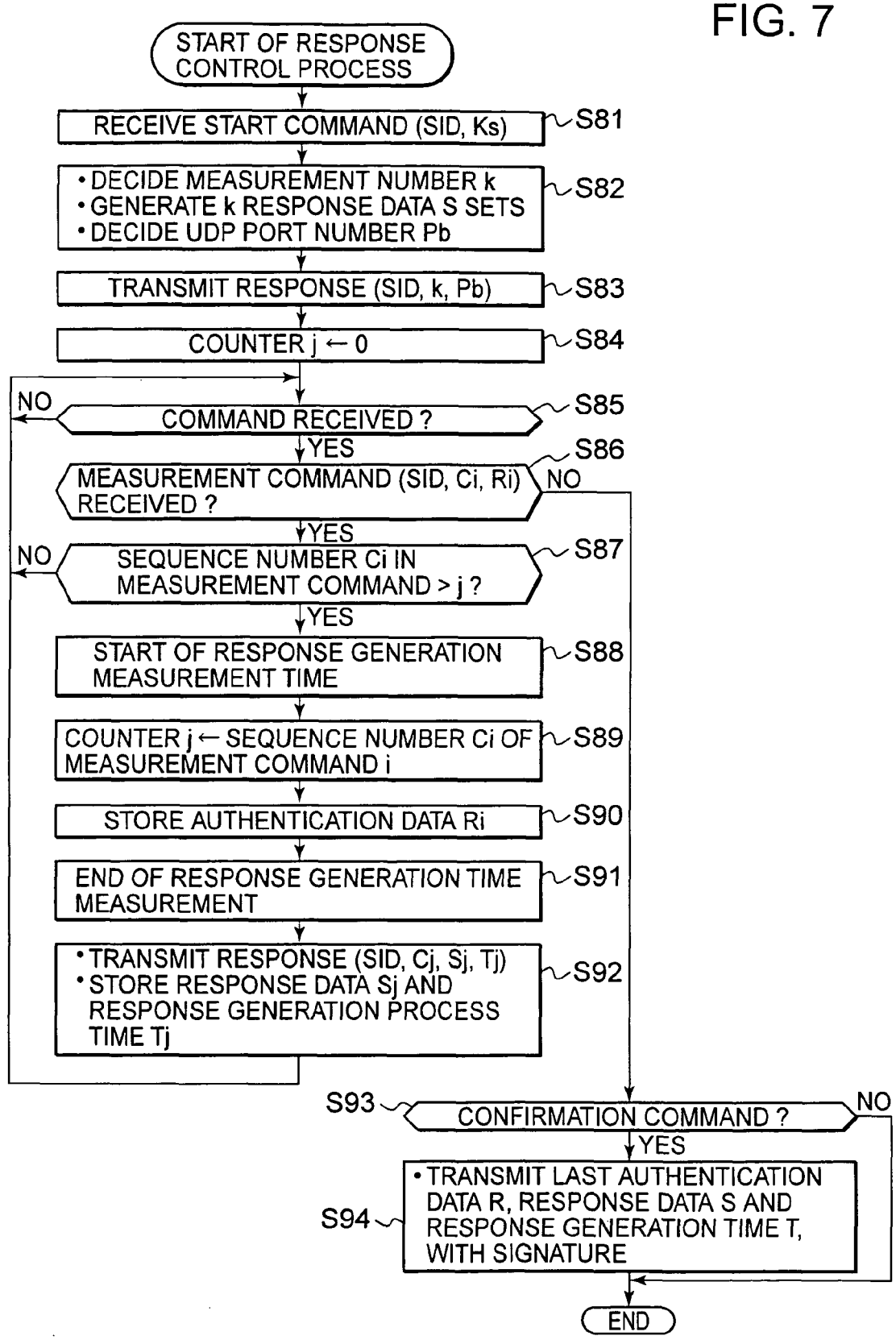
FIG. 7 is a flow chart illustrating a response control process.

Next, with reference to the flow chart shown in FIG. 7, description will be made on the response control process (a process to be executed by the response control unit 22 of the terminal 11).

At Step S81 the control command reception unit 57 of the reception control unit 22 of the terminal 11 establishes a TCP connection in cooperation with the transmission side apparatus, and receives a start command CC (Step S51) indicating that RTT measurement starts, and transmitted from the transmission side apparatus via the TCP connection.

Next, at Step S82 the measurement command reception unit 53 decides the UDP port number pb for reception of the measurement command MC transmitted from the transmission side apparatus.

The measurement reception unit 53 decides, as the number k of RTT measurement retry times at this session, a smaller one of the number ks of RTT measurement retry times capable of being executed at the transmission side apparatus contained in the control start command CC and the number of RTT measurement retry times capable of being processed by the reception side terminal 11. The response data generation unit 52 generates k response data sets S.

At Step S83 the control response transmission unit 58 transmits a response CCR to the transmission side apparatus via the TCP connection established at Step S81, the response CCR including the session number SID, the number k of RTT measurement retry times and the UDP port number pb respectively contained in the control command CC received at Step S81. The transmission side apparatus receives the transmitted response CCR (step S52).

At Step S84 the value of the counter j built in the control unit 51 is initialized to zero.

It is determined at Step S85 whether the command is received. If it is determined that the command is received, the flow advances to Step S86 whereat it is determined whether the received command is the measurement command MC (Step S55). If it is determined that the received command is the measurement command MC, the flow advances to Step S87.

At Step S87 the measurement command reception unit 53 determines whether the sequence number Ci contained in the measurement command MC is larger than the value of the counter j. If it is determined that the sequence number Ci is larger than the value of the counter j, the flow advances to Step S88. The meaning of this process will be later described along with the meaning of the process at Step S58 shown in FIG. 6.

At Step S88 the measurement command reception unit 53 issues a notice STR indicating that the measurement command MC has been received, to the response generation time measurement unit 54. In response to this, the response time measurement unit 54 starts measuring the response generation time.

At Step S89 the value of the counter j is set to the value of the sequence number Ci contained in the measurement command MC. At this time, the response data generation unit 52 supplies the response data Sj corresponding to the set value of the counter j to the measurement response transmission unit 55 and memory unit 56.

Next, at Step S90 the measurement command reception unit 53 reads the authentication data Ri contained in the received measurement command MC, and supplies it to the memory unit 56 and measurement response transmission unit 55. The memory unit 56 stores the authentication data Ri supplied from the measurement command reception unit 53 associated with the value of the counter j.

At Step S91 the measurement command reception unit 53 issues a notice END indicating that reading the authentication data Ri is complete, to the response generation time measurement unit 54. The response generation time measurement unit 54 terminates the response generation time measurement started at Step S88, and supplies a measurement result Tj to the measurement response transmission unit 55 and memory unit 56.

At Step S92 the measurement response transmission unit 55 transmits a response MCR to the transmission side apparatus, the response including the session number SID, the sequence number Cj representative of the value of the counter j, the response data Si supplied from the response data generation unit 52, and the response generation time Tj supplied from the response generation time measurement unit 54. The memory unit 56 stores the response data Sj and response generation time Tj associated with the value of the counter j. Namely, the memory unit 56 stores the authentication data Ri (Step S90), response data Sj and response generation time Tj associated with the value of the counter j.

If it is determined at Step S86 that the command is not the measurement command MC, the flow advances to Step S93 whereat it is determined whether the confirmation command CC (Step S64) is received. If it is determined that the confirmation command CC is received, the flow advances to Step S94.

At Step S94 the control response transmission unit 58 reads from the memory unit 56 the authentication data Ri contained in the last received measurement command MC and the response data Sj and response generation time Ti contained in the response MCR corresponding to the measurement command MC, and transmits them with a signature to the transmission side apparatus.

If it is determined at Step S93 that the command is not the confirmation command (that the end command CC (Step S70) is received), the process is terminated.

In the above manner, the response control process is executed.

In the above description, although k response data sets S are first generated at Step S82, each time the measurement command MC is received at Step S90, the response data S to be used for the response MCR to the measurement command may be generated each time. Alternatively, one response data set S1 may be first generated at Step S82, and after the response MCR is transmitted at Step S92, the response data S to be used for the response MCR to the next measurement command MC may be generated.

Next, description will be made on the meaning of the process at Step S58 shown in FIG. 6. In the process at Step S58, it is determined whether the sequence number Cj of the response MCR from the reception side apparatus is coincident with the sequence number Ci (the value of the counter i) of the measurement command MC. Since the correspondence relation between the measurement command MC and the response command MCR is confirmed, it is possible not to perform RTT authentication based upon the response MCR not corresponding to the measurement command MC (response MCR to another measurement command MC).

Figure 8:
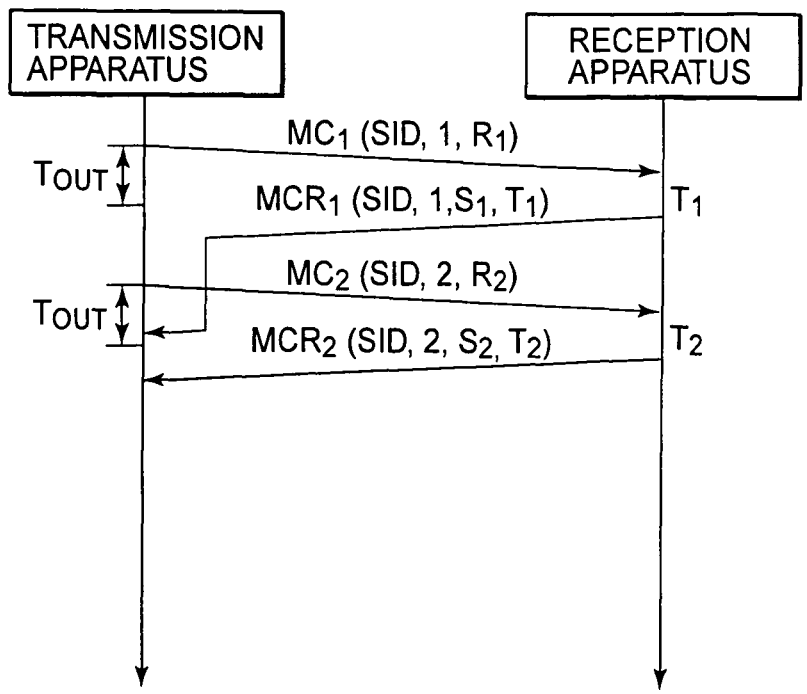
FIG. 8 is a diagram illustrating an operation of the terminals shown in FIG. 2.

For example, as shown in FIG. 8, it is assumed that it takes a long time for the reception side apparatus to transmit a response MCR to the first measurement command MC (Step S92), that the transmission side terminal 11 determines a timeout (Step S57) and that the second measurement command MC is transmitted to the reception side apparatus. It is also assumed that the response MCR to the first measurement command MC is received at the transmission side terminal 11 (Step S56) after the second measurement command MC is transmitted (Step S55) or without a timeout relative to the second measurement command MC (Step S57).

According to the present invention, however, it is determined that the sequence number (=1) of the response MCR from the reception side apparatus is not coincide with the sequence number (=2) of the second measurement command MC. Therefore, the transmission side terminal 11 stands by until the response MCR to the second measurement command MC is received (return to Step S56) so that RTT authentication is not performed even if a non-corresponding response MCR is received.

Figure 9:
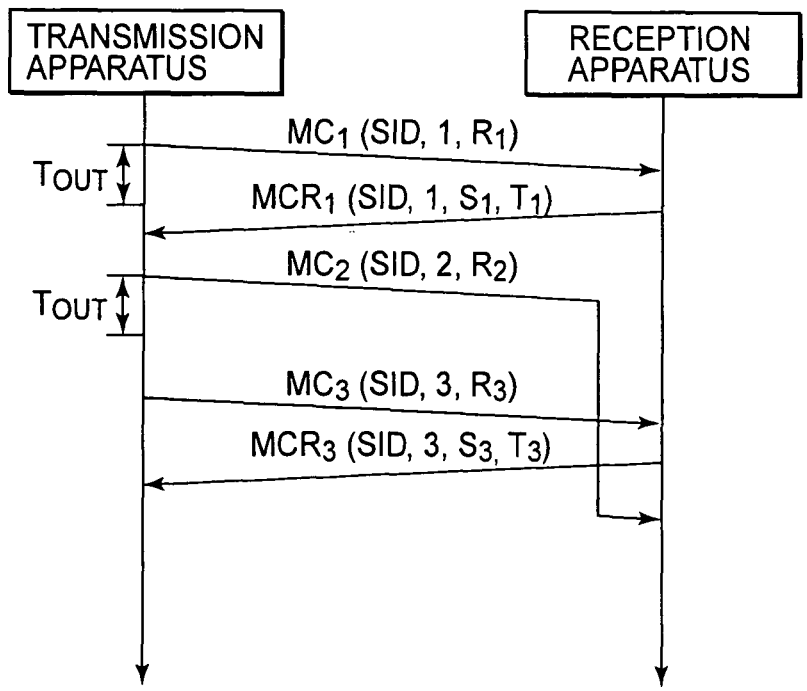
FIG. 9 is another diagram illustrating the operation of the terminals shown in FIG. 2.

Next, description will be made on the meaning of the process at Step S87 shown in FIG. 7. For example, as shown in FIG. 9, it is assumed that the response MCR indicating that the actual RTT is shorter than the specified time TL cannot be obtained for the RTT measurement relative to the first measurement command MC, that although the second measurement command MC is transmitted, arrival of the second measurement command MC at the reception side terminal 11 is delayed so that it is determined as a timeout of the second measurement command MC, and that the third measurement command MC is transmitted from the transmission side apparatus to the reception side terminal 11.

It is also assumed that the second measurement command MC arrives at the reception terminal 11 after the third measurement command MC is received and after the response MCR to the command MC is transmitted.

When the response MCR to the second measurement command MC is generated at the reception side terminal 11, the value of the counter j is 3 (because the response MCR to the third measurement command MC, is being generated). When the response MCR to the second measurement command MC is generated, the sequence number (=2) of the second measurement command MC is smaller than the value (=3) of the counter j. Therefore, Step S87 determines NO so that the response MCR to the second measurement command MC is not generated.

Namely, with the process at Step S87, RTT authentication is not performed in accordance with the response MCR not corresponding to the measurement command MC.

The operation of the terminal 11 for any piracy will be described specifically.

Figure 10:
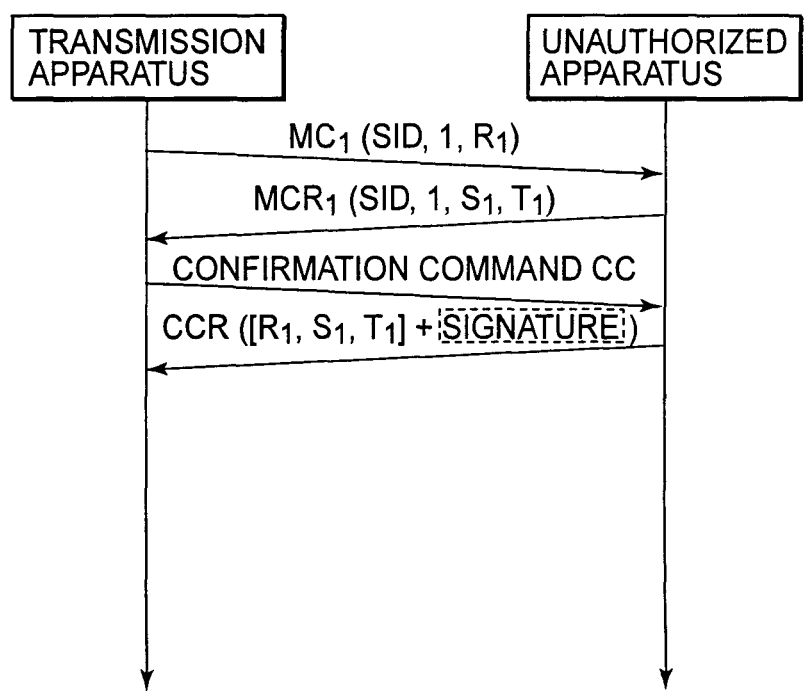
FIG. 10 is another diagram illustrating the operation of the terminals shown in FIG. 2.
Figure 11:
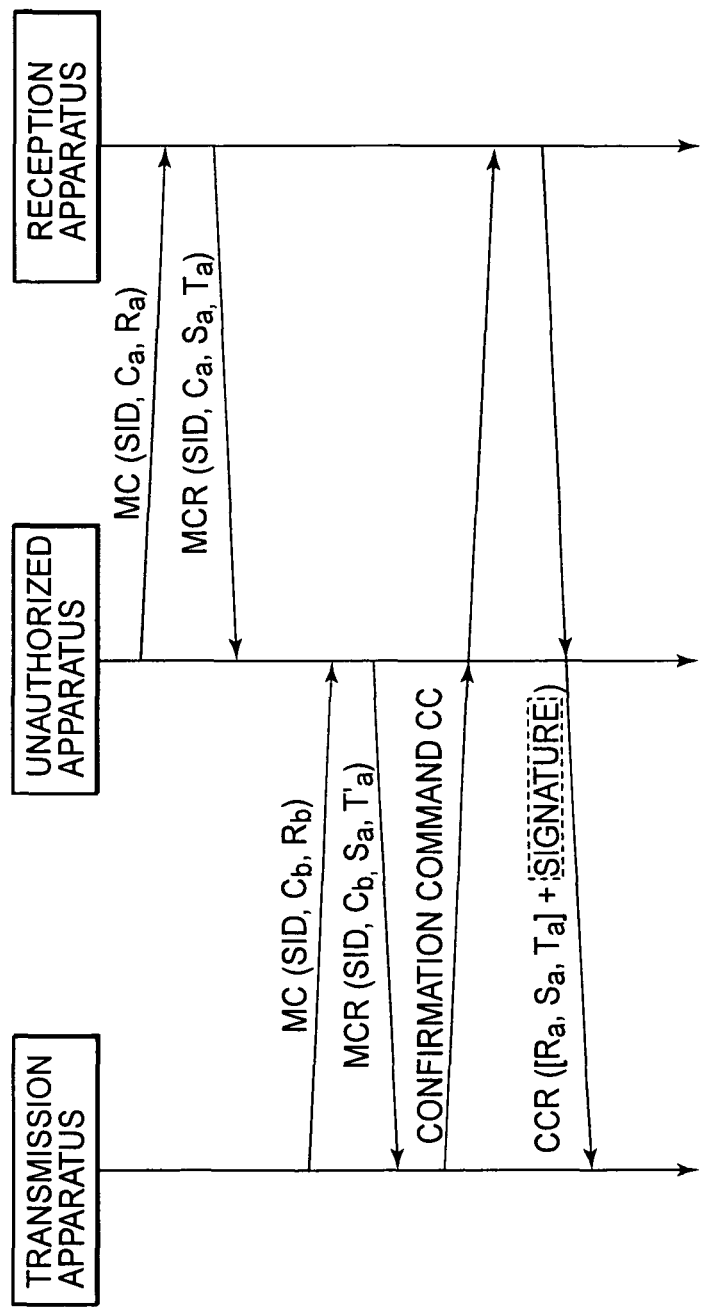
FIG. 11 is another diagram illustrating the operation of the terminals shown in FIG. 2.

For example, as shown in FIG. 1C, as the transmission permission/inhibition process starts for the unauthorized apparatus x connected to the same LAN 1 as that of the transmission side terminal 11, the transmission side terminal 11 transmits the first measurement command MC to the unauthorized apparatus x as shown in FIG. 10, by the process from Step S51 to Step S55.

The unauthorized apparatus x transmits the response MCR to the first measurement command MC to the transmission side terminal 11 by the response control process from Step S81 to Step S92.

In this example, since the unauthorized apparatus x is connected to the same LAN 1 as that of the transmission side terminal 11, it is determined from RTT measurement that the unauthorized apparatus is connected to the same LAN 1 (determination of NO at Step S61), and the confirmation command CC is transmitted from the transmission side terminal 11 to the unauthorized apparatus x by the process at Steps S64 and S65.

Upon reception of the confirmation command CC after the response MCR to the first measurement command MC is transmitted, the unauthorized apparatus x intends to transmit the authentication data contained in the last received measurement command (authentication data R1 of the first measurement command MC) and the response data S1 and response generation time T1 to the transmission side terminal 11, by the process at Step S94. However, since the unauthorized apparatus x does not have the information necessary for creating a proper signature, the unauthorized apparatus x transmits these data without a signature or with an improper signature to the transmission side terminal 11 as the response CCR.

In this case, since the transmission side terminal 11 cannot verify the signature, it determines that the RTT measurement partner is not identical to the provider of the information only an authorized apparatus can know (Step S66) and the content is not transmitted (Step S68).

Another type of piracy can be considered in which the unauthorized apparatus x connected to the same LAN 1 as that of the transmission side terminal 11 generates the response MCR to the measurement command MC, and the authorized terminal 11 generates the response CCR to the confirmation command CC.

In this case, the unauthorized apparatus x first performs identity theft of the transmission side terminal 11, and transmits the measurement command MC including the authentication data Ra to the reception side terminal 11 by the process from Step S51 to S55, to make the reception side terminal 11 transmit the response MCR including the response data Sa and response generation time Ta by the process from Step S81 to Step S92 and to acquire the response MCR.

Thereafter, the unauthorized apparatus x performs identity theft of the reception side terminal 11. Upon reception of the measurement command MC including the authentication data Rb transmitted from the transmission side terminal 11 by the process from Step S51 to Step S55, the unauthorized apparatus x transmits the response MCR to the transmission side terminal (Step S92), the response MCR including the response data Sa contained in the response MCR acquired from the authorized reception side terminal 11 and the response generation time Ta' sufficiently longer for Step S61 to determine NO.

As a result, the confirmation command CC is transmitted from the transmission side terminal 11 (Step S64), and the unauthorized apparatus x transmits the confirmation command CC directly to the reception side terminal 11. Upon reception of the confirmation command CC, the reception side terminal 11 transmits the response CCR to the transmission side terminal 11, the response CCR including the authentication data contained in the last received measurement command MC (in this example, authentication data Ra contained in the measurement command MC supplied from the unauthorized apparatus x), and the response data Sa and response generation time Ta contained in the response MCR to the measurement command MC, respectively affixed with a signature.

Although the transmission side terminal 11 can analyze the signature of the response CCR from the reception side terminal 11, the authentication data Ra contained in the response CCR is not coincide with the authentication data last transmitted from the transmission side terminal 11 (authentication data Rb of the measurement command MC transmitted to the unauthorized apparatus x) (Step S66 determines NO). Therefore, the content is not supplied to the unauthorized apparatus x.

According to the present invention, piracy can be avoided properly.

In the above description, each time the response MCR is generated, the reception side terminal 11 measures the response generation time. Instead, a predetermined time such as a shortest necessary time may be decided beforehand, and this time (fixed value) is used as the response generation time T.

It is not necessary to consider the response generation time T if the response generation time T is not so long as to influence the RTT measurement (if a communication transmission time is long or if a response generation process is performed in sufficiently short time in the fabrication of the reception side apparatus).

It should be understood by those skilled in the art that various modifications, combinations, sub-combinations and alterations may occur depending on design requirements and other factors insofar as they are within the scope of the appended claims or the equivalents thereof.

What is claimed is:

1. A transmitting apparatus connected to a communication medium for determining whether to transmit a predetermined content to a reception apparatus, said transmitting apparatus comprising:
    generation means for generating authentication data;
    measurement command transmission means for transmitting a command via the communication medium to the reception apparatus for authentication of the reception apparatus, the transmitted command including at least a portion of the authentication data generated by the generation means;
    measurement response reception means for receiving a response to the transmitted command, the response received from the reception apparatus and including response data having a number of authentication retry times;
    measuring means for measuring a round trip response time to the command;
    authentication means for authenticating the reception apparatus in accordance with the round trip response time and the response data, the reception apparatus authenticated upon determination that the round trip response time minus a generation time for the reception apparatus to generate the response to the command is below a predetermined interval;
    control command transmission means for transmitting, upon authentication of the reception apparatus by the authentication means, a confirmation command request requesting the reception apparatus to transmit confirmation data related to the authentication data contained in the command and the response data contained in the response to the command; and
    determination means for determining whether to transmit the predetermined content to the reception apparatus based on the confirmation data from the reception apparatus, wherein
    transmission of the command for authentication of the reception apparatus according to the round trip response time minus the generation time to generate the response command is automatically repeated without manual input upon determination that the reception apparatus is unauthenticated and the command has been transmitted less than the number of authentication retry times.

2. The transmitting apparatus according to claim 1, wherein the determination means further comprises means for determining whether to transmit the predetermined content to the reception apparatus in accordance with a signature created from the authentication data, the response data, and data shared among apparatuses capable of using the content, transmitted from the reception apparatus in response to a request from the control command transmission means.

3. The apparatus according to claim 1, wherein the measuring means measures the round trip response time from when the command is transmitted from the measurement command transmission means to when the response to the command is received by the measurement response reception means.

4. A method performed by a transmitting apparatus connected to a communication medium for determining whether to transmit a predetermined content from the transmitting apparatus to a reception apparatus via the communication medium, said method comprising:
    generating authentication data;
    transmitting, by a measurement command transmission unit of the transmitting apparatus, a command from the transmitting apparatus to the reception apparatus via the communication medium for authentication of the reception apparatus, the transmitted command including at least a portion of the authentication data generated by the generating step;
    receiving a response to the command, the response received from the reception apparatus and including response data having a number of authentication retry times;
    measuring a round trip response time between transmitting the command and receiving the response;
    authenticating the reception apparatus in accordance with the round trip response time and the response data, the reception apparatus authenticated upon determination that the round trip response time minus a generation time for the reception apparatus to generate the response to the command is below a predetermined interval;
    upon authentication of the reception apparatus, transmitting a confirmation command request requesting the reception apparatus to transmit confirmation data related to the authentication data contained in the command and the response data contained in the response to the command;
    determining whether to transmit the predetermined content to the reception apparatus based on the confirmation data from the reception apparatus; and
    automatically repeating, without manual input, transmission of the command for authentication of the reception apparatus according to the round trip response time minus the generation time to generate the response to the command upon determination that the reception apparatus is unauthenticated, and the command has been transmitted less than the number of authentication retry times.

5. The method of claim 4, wherein
    the transmitted command includes another number of authentication retry times, and
    the number of authentication retry times received in response to the command indicates the smaller amount of authentication retry times between the another number of authentication retry times and the number of authentication retry times that can be performed by the reception apparatus.

6. A reception apparatus connected to a communication medium for receiving a predetermined content from a transmission apparatus, said reception apparatus comprising:
   measurement command reception means for receiving a command from the transmission apparatus via the communication medium, the received command including authentication data transmitted from the transmission apparatus;
   measurement response transmission means for transmitting, to the transmission apparatus, a response to the received command, the response including predetermined response data to the command, the response data having a number of authentication retry times;
   control command reception means for receiving, after authentication of the reception apparatus by the transmission apparatus, a confirmation command request from the transmission apparatus, the authentication indicating that a round trip response time for transmission and reception of the command between the transmission apparatus and reception apparatus, minus a generation time for the reception apparatus to generate the response to the command, is below a predetermined interval; and
   control response transmission means for transmitting, to the transmission apparatus, a confirmation data related to the authentication data contained in the command and the response data contained in the response to the command in response to the confirmation command request from the transmission apparatus, wherein
   transmission of the command for authentication of the reception apparatus according to the round trip response time minus the generation time to generate the response command is automatically repeated without manual input upon determination that the reception apparatus is unauthenticated and the command has been received less than the number of authentication retry times.

7. The reception apparatus according to claim 6,
   wherein the control response transmission means further comprises means for creating a signature based on the authentication data, the response data, and data shared among apparatuses capable of using the predetermined content and for transmitting the signature to the transmission apparatus.

8. A method performed by a receiving apparatus connected to a communication medium for receiving a predetermined content from a transmission apparatus via the communication medium, said method comprising:
   receiving, by a measurement command reception unit of the receiving apparatus, commands from the transmission apparatus via the communication medium, each received command including authentication data transmitted from the transmission apparatus;
   transmitting, to the transmitting apparatus, a response to a command in the commands, the response including predetermined response data to the command, the response data having a number of authentication retry times;
   receiving, after authentication of the reception apparatus by the transmission apparatus, a confirmation command request from the transmission apparatus, the authentication indicating that a round trip response time for transmission and reception of the command between the transmission apparatus and receiving apparatus, minus a generation time for the receiving apparatus to generate the response to the command, is below a predetermined interval;
   transmitting, to the transmission apparatus, a confirmation data related to the authentication data contained in the command and the response data contained in the response to the command in response to the confirmation command request from the transmission apparatus; and
   automatically repeating reception, by the measurement command reception unit without manual input, of the command for authentication of the receiving apparatus according to the round trip response time minus the generation time to generate the response to the command upon determination that the receiving apparatus is unauthenticated and the command has been received less than the number of authentication retry times.

9. A transmitting apparatus connected to a communication medium for determining whether to transmit a predetermined content to a reception apparatus, said transmitting apparatus comprising:
   circuitry configured to
   generate authentication data,
   transmit a command to the reception apparatus via the communication medium for authentication of the reception apparatus, the transmitted command including at least a portion of the authentication data,
   receive a response to the command, the response received from the reception apparatus and including response data having a number of authentication retry times,
   measure a round trip response time between transmitting the command and receiving the response,
   authenticate the reception apparatus in accordance with the response time and the response data, the reception apparatus authenticated upon determination that the round trip time response time minus a generation time for the reception apparatus to generate the response time to the command is below a predetermined interval,
   transmit, upon authentication of the reception apparatus, a confirmation command request requesting the reception apparatus to transmit confirmation data related to the authentication data contained in the command and the response data contained in the response to the command, and
   determine whether to transmit the predetermined content to the reception apparatus based on the confirmation data from the reception apparatus, wherein
   transmission of the command for authentication of the reception apparatus according to the round trip response time minus the generation time to generate the response command is automatically repeated without manual input upon determination that the reception apparatus is unauthenticated and the command has been transmitted less than the number of authentication retry times.

10. A reception apparatus connected to a communication medium for receiving a predetermined content from a transmission apparatus, said reception apparatus comprising:
    circuitry configured to
    receive a command from the transmission apparatus via the communication medium, the received command including authentication data transmitted from the transmission apparatus,
    to the transmission apparatus, a response to the command, the response including predetermined response data to the command, the response data having a number of authentication retry times,
    receive, after authentication of the reception apparatus by the transmission apparatus, a confirmation command request from the transmission apparatus, the authentication indicating that a round trip response time for transmission and reception of the command between the transmission apparatus and reception apparatus, minus a generation time for the reception apparatus to generate the response to the command, is below a predetermined interval, and transmit, to the transmission apparatus, a confirmation data related to the authentication data contained in the command and the response data contained in the response to the command in response to the confirmation command request from the transmission apparatus, wherein transmission of the command for authentication of the reception apparatus according to the round trip response time minus the generation time to generate the response command is automatically repeated without manual input upon determination that the reception apparatus is unauthenticated and the command has been received less than the number of authentication retry times.

11. A system comprising:

a transmitting apparatus connected to a communication medium;

a reception apparatus, the transmitting apparatus configured to determine whether to transmit a predetermined content to the reception apparatus;

the transmitting apparatus further including:
  circuitry configured to
  generate authentication data,
  transmit a command to the reception apparatus via the communication medium for authentication of the reception apparatus, the transmitted command including at least a portion of the authentication data,
  receive a response to the command, the response received from the reception apparatus and including response data having a number of authentication retry times,
  measure a round trip response time between transmitting the command and receiving the response,
  authenticate the reception apparatus in accordance with the response time and the response data, the reception apparatus authenticated upon determination that the round trip response time minus a generation time for the reception apparatus to generate the response to the command is below a predetermined interval,
  transmit, upon authentication of the reception apparatus, a confirmation command request requesting the reception apparatus to transmit confirmation data related to the authentication data contained in the command and the response data contained in the response to the command, and
  determine whether to transmit the predetermined content to the reception apparatus based on the confirmation data from the reception apparatus; and the reception apparatus further including:
  circuitry configured to
  receive commands from the transmission apparatus via the communication medium, each received command including authentication data transmitted from the transmission apparatus,
  transmit, to the transmission apparatus, a response to a command in the received commands, the response including predetermined response data to the command, the response data having a number of authentication retry times,
  receive, after authentication of the reception apparatus by the transmission apparatus, a confirmation command request from the transmission apparatus, and
  transmit, to the transmission apparatus, a confirmation data related to the authentication data contained in the command and the response data contained in the response to the command in response to the confirmation command request from the transmission apparatus, wherein transmission of the command for authentication of the reception apparatus according to the round trip response time minus the generation time to generate the response command is automatically repeated without manual input upon determination that the reception apparatus is unauthenticated and the command has been transmitted less than the number of authentication retry times.

12. The apparatus of claim 11, wherein the transmitted command includes another number of authentication retry times, and the number of authentication retry times received in response to the command indicates the smaller amount of authentication retry times between the another number of authentication retry times and the number of authentication retry times that can be performed by the reception apparatus.

13. A non-transitory computer readable storage medium having executable instructions stored therein which, when executed by a processor in a transmitting apparatus for determining whether to transmit a predetermined content to a reception apparatus, causes the processor to perform steps comprising:

generating authentication data;

transmitting a command to the reception apparatus for authenticating the reception apparatus, the transmitted command including at least a portion of the authentication data generated by the generating step;

receiving a response to the command in the transmitted commands, the response received from the reception apparatus and including response data having a number of authentication retry times;

measuring a round trip response time between transmitting the command and receiving the response;

authenticating the reception apparatus in accordance with the response time and the response data, the reception apparatus authenticated upon determination that the round trip response time minus a generation time for the reception apparatus to generate the response to the command is below a predetermined interval;

upon authentication of the reception apparatus, transmitting a confirmation command request requesting the reception apparatus to transmit confirmation data related to the authentication data contained in the command and the response data contained in the response to the command;

determining whether to transmit the predetermined content to the reception apparatus based on the confirmation data from the reception apparatus; and automatically repeating, without manual input, transmission of the command for authentication of the reception apparatus according to the round trip response time minus the generation time to generate the response to the command upon determination that the reception apparatus is unauthenticated and the command has been transmitted less than the number of authentication retry times.

14. A non-transitory computer readable storage medium having computer executable instructions stored therein which, when executed by a processor in a receiving apparatus for receiving a predetermined content from a transmission apparatus, causes the processor to perform steps comprising:

receiving a command including authentication data from the transmission apparatus;

transmitting, to the transmitting apparatus, a response to the command, the response including predetermined response data to the command, the response data having a number of authentication retry times;

receiving, after authentication of the reception apparatus by the transmission apparatus, a confirmation command request from the transmission apparatus, the authentication indicating that a round trip response time for transmission and reception of the command between the transmission apparatus and receiving apparatus, minus a generation time for the receiving apparatus to generate the response to the command, is below a predetermined interval;

transmitting, to the transmission apparatus, a confirmation related to the authentication data contained in the command and the response data contained in the response to the command in response to the confirmation command request from the transmission apparatus; and automatically repeating, without manual input, reception of the command for authentication of the receiving apparatus according to the round trip response time minus the generation time to generate the response to the command upon determination that the receiving apparatus is unauthenticated, and the command has been received less than the number of authentication retry times.

* * * * *